United States Patent
Kutuzov et al.

(10) Patent No.: US 10,992,744 B1
(45) Date of Patent: Apr. 27, 2021

(54) ALLOCATION OF SERVER RESOURCES IN REMOTE-ACCESS COMPUTING ENVIRONMENTS

(71) Applicant: Parallels International GmbH, Schaffhausen (CH)

(72) Inventors: Alexey Kutuzov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 16/554,925

(22) Filed: Aug. 29, 2019

(51) Int. Cl.
*H04L 29/08* (2006.01)

(52) U.S. Cl.
CPC .............. *H04L 67/1012* (2013.01)

(58) Field of Classification Search
CPC ... H04L 67/28; H04L 29/08702; H04L 67/02; H04L 67/04; H04L 69/329; H04W 4/029; H04W 4/021
See application file for complete search history.

(56) References Cited

U.S. PATENT DOCUMENTS

| | | | |
|---|---|---|---|
| 2013/0212288 A1* | 8/2013 | Jakubowski | H04L 67/08 709/228 |
| 2020/0272511 A1* | 8/2020 | Gauthier | G06F 9/5083 |

* cited by examiner

*Primary Examiner* — El Hadji M Sall
(74) *Attorney, Agent, or Firm* — Rosenberg, Klein & Lee (57) ABSTRACT

The subject matter of this specification can be implemented in, among other things, a method and a system to perform the method that includes receiving a request from a client device to execute an application, selecting servers that provide remote desktop environment and host the requested application, determining, based on a priority level for a client session to be established, a capacity of system resources and a current utilization level of each server, that the client device is to be directed to a first server, the first server having an expected utilization level that satisfies a threshold condition, and directing the request to the first server to establish the client session and to execute the requested application as part of the client session.

22 Claims, 5 Drawing Sheets

ALLOCATION OF SERVER RESOURCES IN REMOTE-ACCESS COMPUTING ENVIRONMENTS

TECHNICAL FIELD

This instant specification generally relates to running applications from a client device using a remote-access computing environment. More specifically, the instant specification relates to optimized allocation of server resources among multiple client sessions and to efficient prioritizing of client sessions for execution on remote-access terminal servers.

BACKGROUND

In a network environment, it is often advantageous for a user of a computing device to execute applications on a remote server rather than on the local device. Multiple client devices (clients) can have access to the remote server and applications installed on that server. Such server-based computing eliminates the need to install and upkeep separate applications on client devices, decreases administrative demands and costs, promotes uniformity of user experiences, and ensures interchangeability of client devices. Server-based computing allows utilizing remote server's computing power and memory capabilities, which often significantly exceed resources available on client devices. Often, a client device is a "lean" (or "thin") machine, which itself performs little computing, or storage of data, with only keyboard, mouse, and graphical interface data exchanges between the lean client and the remote server device while the bulk of computing, data processing, and data storage takes place on the remote server. The applications executed on the remote server are being delivered to the client device via, for example, a remote desktop session, where the local client device communicates with the remote sever using a remote display protocol.

DETAILED DESCRIPTION

The implementations disclosed herein provide for efficient allocation of server resources among multiple client sessions which may have different priority levels and, hence, may receive different shares of system resources of the remote-access terminal servers. In a network environment, it is often advantageous for a user of a client device to execute applications on a remote server rather than on the client device. In a remote-access environment, a host server (e.g., a gateway server) offering remote access functionality may provide a network connection to the client device and receive a request from the user of the client device to execute an application. The host server may utilize terminal servers to execute requested applications. A terminal server refers herein to a component (e.g., a software component of a host server or a separate device connected to the host server via a network) that is able to execute a particular application (residing locally or remotely) in response to the host server's instruction identifying the application.

The host server may instruct one of the terminal servers connected to the network to execute the application and facilitate an association of the client device with the terminal server (e.g., establish a client session). The terminal server may enable the user of the client device to use the resources of the terminal server to execute the application thereon as if the application were local to the client device. However, utilization of terminal servers can present a number of issues and challenges. For example, the terminal sever may be providing remote access to a significant number of client devices with each client device, possibly, executing multiple applications. In some instances, the first terminal server may become overloaded with applications run and operated by a large number of client devices, which may result in a diminished quality of experiences of the users of some or all of the client devices. This may happen, for example, if the central processor unit(s) (CPU) of the terminal server has to serve an excessive number of applications running concurrently within various client sessions. In other instances, overloading may happen if the memory allocated to each or some of the client sessions and applications becomes insufficient for their optimal performance or if the disk queue has too many requests from various client sessions. In some instances, it is the bandwidth of the network connection to the terminal server that may become overloaded, so that the throughput from/to some (or all) client devices may decrease below an acceptable minimum.

In some remote-server computing environments, overloading of terminal servers is addressed by limiting the number of client sessions that may be supported by a particular terminal server, with servers having more system resources tasked with handling more client sessions compared to servers having more modest computing capabilities. However, although such approach may prevent overburdening a terminal server with an excessive number of clients/client sessions, it does not prevent some client sessions from consuming a disproportionate amount of the terminal server resources, at the detriment to other users and client sessions.

Another possible approach is to distribute system resources (CPU processing time, memory, disk space, network bandwidth) uniformly among active sessions. Such an approach suffers from its own shortcomings. Namely, a critical computation-intensive application may be allocated too few resources for the magnitude of its processing tasks whereas a low-priority session may unnecessarily receive too many resources.

Aspects of the instant disclosure address this and other problems by assigning different priority levels to various client sessions and different maximum utilization levels to various terminal servers. When a client device requests a new client session to execute an application, a host/gateway server may determine which terminal server is to instantiate and support the new client session based on the priority level of the new session, capacities of one or more terminal servers that are capable of hosting the requested application, and current utilization levels of the terminal servers. A utilization level of a terminal server may depend on the number and priority level of client sessions already supported by the terminal server. For example, a terminal server may support fewer high priority client sessions or more lower-priority client sessions. Having made the determination about the priority levels of currently active (and, in some implementations, idle or disconnected) sessions, the server capacities and the current server utilization levels, the host/gateway server may select a particular terminal server where the new client session may be instantiated. For example, the terminal server may be required to have an expected utilization level—after the new session is added to the terminal server—that is no more than some threshold level (e.g., no more than 80%, 90%, of the capacity of the terminal server). Enforcing threshold conditions may ensure that the client sessions, which are supported by the terminal server, have sufficient additional resources in case the applications run within these client sessions experience a sudden spike in computational demands.

Figure 1:
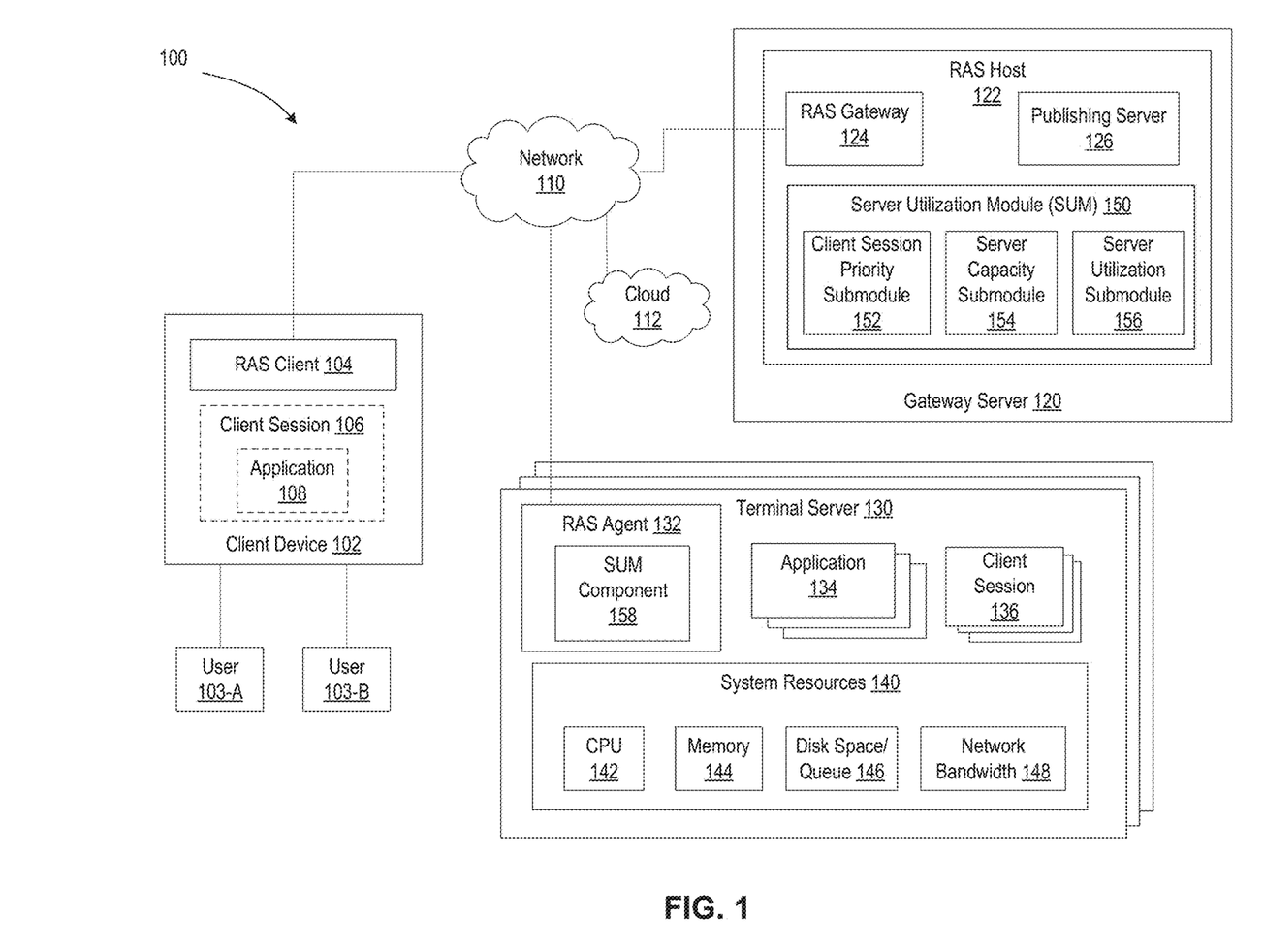
FIG. 1 illustrates schematically a high-level block diagram of an exemplary remote access network environment performing optimized allocation of server resources to client sessions, in accordance with some implementations of the present disclosure.

FIG. 1 illustrates schematically a high-level block diagram of an exemplary remote access network environment 100 performing optimized allocation of server resources to client sessions, in accordance with some implementations of the present disclosure. The remote access environment 100 may be a remote desktop service (RDS) environment. In some implementations, the remote access environment 100 may provide virtual machines to client devices. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity and conciseness. Various other computer systems, software or hardware components, and/or methods of their interconnection—which are not shown in FIG. 1—may be compatible with the methods and systems described herein. The systems and methods described herein may be implemented in hardware (e.g., general purpose and/or specialized processing devices, and/or other devices and associated circuitry), software (e.g., instructions executable by a processing device), firmware, or a combination thereof. Various aspects of the disclosure are described in details below by way of examples, rather than by way of limitation.

As schematically illustrated by FIG. 1, the client-remote host computing environment may comprise one or more client devices 102, which may communicate over a network 110 with a gateway (host) server 120 and one or more terminal servers 130. The network 110 can be Internet, LAN, or a telecommunications network. The network can have access to a cloud storage 112. The cloud storage 112 may be located off-premises and use third-party cloud storage services or similar platforms. Alternatively, the cloud storage 112 can be located on-premises. The cloud storage can be a part of the gateway server 120, one of the terminal servers 130, or one of the client devices 102. Each client device may support one or more users, such as user 103-A and/or user 103-B. In the description below, the singular terms, such as "client device," "host," "server," "environment," etc. will be understood to also correspond to plural terms, whenever more than one device or component can possibly be used.

Figure 5:
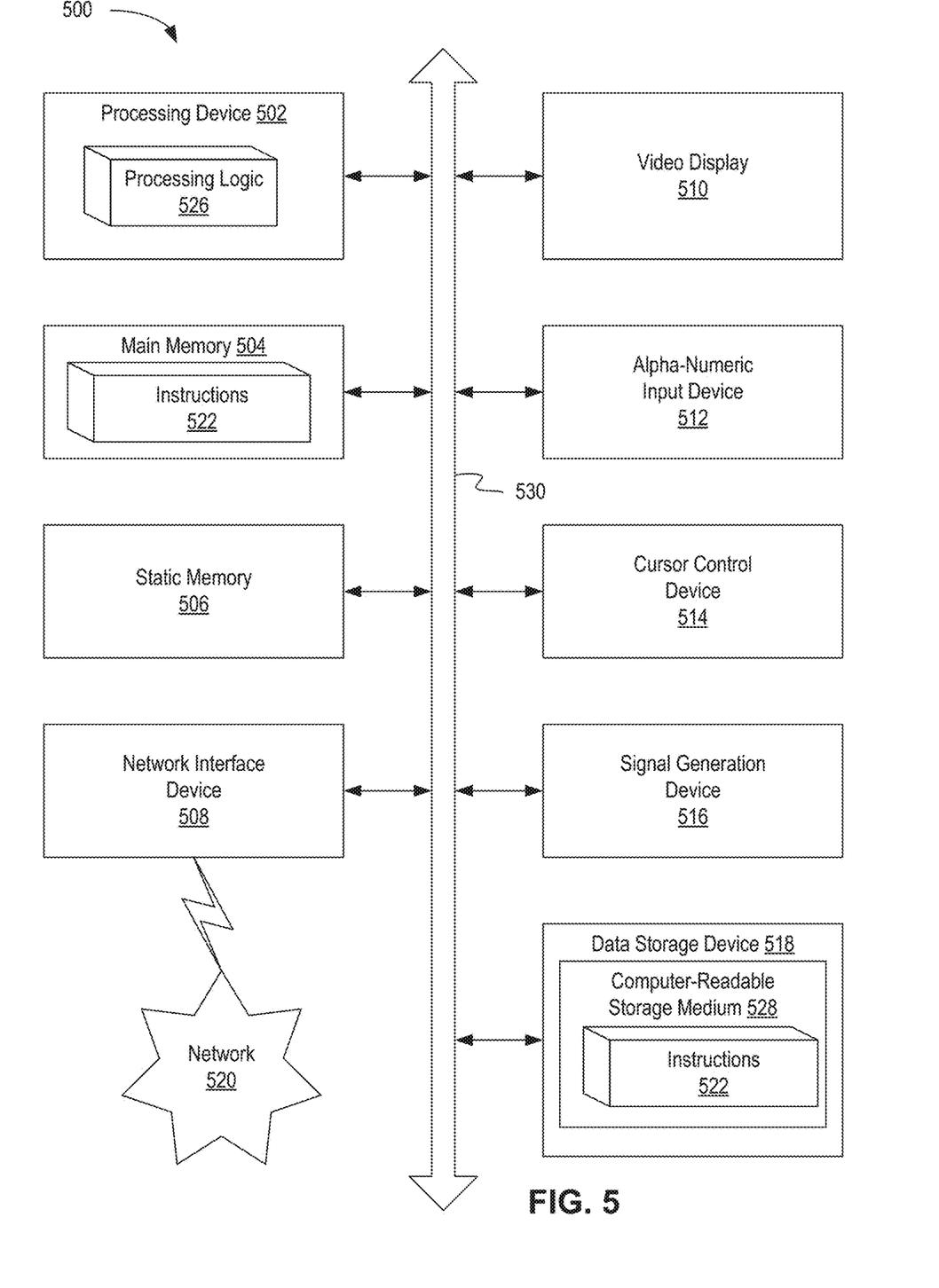
FIG. 5 depicts a block diagram of an example computer system operating in accordance with one or more aspects of the present disclosure.

The terminal server 130 may include one or more CPUs—not explicitly shown on FIG. 1—also referred to as "processing devices," communicatively coupled to one or more memory devices, and one or more peripheral devices via buses (as shown in more detail in FIG. 5). "Processing device" refers herein to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The terminal server(s) 130 may, alone or in conjunction with the gateway (host) server 120, implement the remote access environment. The remote access environment may be a virtual execution environment such as an RDS, a virtual desktop infrastructure, a containerization engine, a virtual execution environment provided by an HTML5-enabled browser, etc. The remote access environment may provide client authentication, load balancing, and/or other features related to brokering the client connections to the virtual execution environments. In one illustrative example, the remote access environment may be enabled by the Parallels® RAS. The gateway server 120 may include a remote application server component (RAS host) 122. The RAS host 122 may be connected to the network 110 via a secure RAS gateway 124. The RAS host 122 may be communicating with an optional client authenticating service (not shown) which facilitates verification of the identity of a user (e.g., a user 103-A) of the client device 102. Upon establishing a connection with the client device 102, the client authenticating service may determine the level of access the particular user/client device combination may have to the RAS host 122. By way of example, a user with the highest access level connecting from a work (e.g., desktop) computer may be allowed the maximum access to the RAS host 122 (such as the number of applications that the user may access on the remote computing environment) whereas the same user accessing the host server 120 from a mobile device may be allowed a more limited access to the RAS host 122. In some implementations, client sessions instantiated and provided to users of the client device 102 may also be ranked by priority levels, so that users with a higher priority level would be allowed to use a larger share of system resources of the terminal server that may be selected (as explained below) to support the client session. In some implementations, the access level and the priority level may indicate the same thing, or may be correlated (so that a user with a higher access level is also likely to be assigned a higher priority level). In other implementations, the access level and the priority level of a user may be unrelated. For example, the user 103-A may have access to a broad range of applications whereas the user 103-B may have access to one or only a few applications of high importance and/or high computational demands. User 103-B may, therefore, have a higher priority level compared with user 103-A.

Once the client authenticating service determines the access level, the RAS host 122 may provide the list of resources available to the client device 102 via a publishing server 126 and transmit this list to the client device 102 via the network 110. In some implementations, the publishing server 126 may be located on a computing device different from the gateway server 120. For example, the publishing server 126 may be located on the terminal server 130, on cloud 112, or on a designated separate device. A RAS client 104 may be located on the client device 102. The RAS client 104 may receive the list of published applications from the remote gateway/host server 120 and offer this list to one or more users 103 of the client device 102. The list may have graphical representations, such as windows, pop-ups, icons, etc. A console of the RAS host 122 may be used to display a list of published applications on the RAS client 104. The RAS client 104 may allow the user(s) 103 of the client device 102 to launch one or more applications on the remote host as if the application(s) were executed on the client device 102. The RAS client 104 may transmit the list of client-selected applications to be executed on a remote access environment to the RAS host 122 of the gateway (host) server 120 over the network 110 and through the RAS gateway 124. The term "client-selected" should be understood in the broadest sense as including those applications that a human operator chooses to launch as well as applications that are executed automatically by the client device 102, such as applications auto-run during boot, at the start of a workday, or in response to actions taken by the user (such as starting a mail client or another application), or triggered by extrinsic events (such as a start of a teleconference, at a pre-arranged time).

In some embodiments, RAS client 104 may be an HTML5-enabled browser. In such embodiments, the remote access environment 100 may be configured to display published remote applications in one or more HTML pages which may be accessed by HTML5-enabled browsers running on the client devices. Thus, from the user's perspective, the published remote applications may be perceived as web-based applications. A menu associated with each entry of the list may include a plurality of actions accessible to the user with respect to the published application, such as the client gateway identifier, the published application identifier, and the height and width of the frame to be displayed by the client device for rendering the application output. A JavaScript code may be utilized for receiving and displaying the data by the client browser.

Responsive to the user's selection from the list of applications provided to the RAS client 104 by the RAS host 122, the gateway server 120 may determine what specific terminal server 130 may be selected to establish the new client session and to execute the requested application as part of the client session using one or more CPUs, memory devices, disk space, as well as other resources of the terminal server 130. (Henceforth, the singular word "application" may be understood as a plurality of applications selected by the user.)

In some implementations, to select a terminal server that is to support the new client session, the RAS host 122 may use a server utilization module (SUM) 150. The SUM 150 may include a client session priority submodule 152, a server capacity submodule 154, and a server utilization submodule 156, in one exemplary implementation.

The client session priority submodule 152 may maintain listings (e.g., an Active Directory) of client devices 102 and/or users 103 that are authorized to use the remote access environment 100. In some instances, the listings may be individualized with each client device 102 and/or user 103 receiving a separate priority level. In other instances, the listings may be group listings with each client device 102 and/or user 103 classified as a member of one or more groups. For example, when during or after authentication on the gateway server 120, the user 103-A selects an application A, this may indicate to the SUM 150 that the client session to be provided to the user 103-A is to have a priority level corresponding to a first group membership. On the other hand, if the user 103-A does not select the application A (choosing instead an application B or C), the client session to be provided to the user 103-A is to have a different (higher or lower) priority level corresponding to a second group membership. In some implementations, the priority level may be determined by the identity of the client device 102, so that all users 103 of the client device 102 may have the same priority level. In some implementations, the priority level may be determined by the identity of the user 103, so that regardless of what client device 102 the user 103 uses to connect to the gateway (host) server 120, the user's session may have the same priority level. In some implementations, both the identity of the user 103 and the identity of the client device 102 may determine the priority level. For example, the user 103 accessing the gateway server 120 from an office computer client device may have a higher priority level than the same user accessing the gateway server 120 from a home computer.

The SUM 150 may further have a server capacity submodule 154 which may maintain listings of the capacity of at least some of the terminal servers 130 of the remote-access environment 100. The server capacity of a specific terminal server 130 may characterize various components of the system resources 140 of the terminal server 130, such as a speed of the CPU 142, the amount of memory 144 (such as SRAM or DRAM, in one implementation), the volume of the disk space 146, the speed of a disk queue processing, the network bandwidth 148 of the connection to the terminal server 130, and other system resources. The server capacity submodule 154 may receive and maintain updates about system upgrades, modifications, and maintenance of the terminal server(s) 130. The updates may be received at scheduled time intervals, or whenever a change to the terminal server 130 resources is implemented. As a result, the server capacity submodule 154 may have an up-to-date information about the maximum possible load (e.g., the number of client sessions and applications) that the terminal server(s) 130 may be capable to support.

The SUM 150 may further have a server utilization submodule 156 which may be capable of keeping track of current (e.g., real-time) loads of at least some of the terminal servers 130 of the remote-access environment 100. A current utilization level of a server may refer to some quantitative metrics (e.g., an actually measured data or an inferred estimate) indicative of a share of the server's system resources 140 that are being used up by various active (idle, disconnected, etc.) client sessions 136 currently supported by the terminal server 130. The metrics may be a percentage of the system resources being currently utilized, in one implementation. The server utilization level may take into account the number and nature of the applications 134 run as part of the client sessions 136. In some implementations, the server utilization submodule 156 may receive real-time data (e.g., every hour, half hour, fifteen minutes, five minutes, one minute, depending on the variability of the terminal server loads) regarding utilization of the terminal server(s) 130. In other implementations, a proxy quantity (rather than real-time monitoring data) may be used to represent the current utilization level of the terminal server 130. For example, an application A (when executed within a given client session) may be listed as taking 5% of the resources of a first terminal server or 2% of the resources of a second terminal server, whereas an application B may be listed as taking 1% of the resources of the first terminal server or 0.5% of the resources of the second terminal server. The percentage of the system resources 140 in this example may refer to the speed of the CPU 142, the amount of memory 144, the volume of the disk space 146 or the length of the disk queue, the network bandwidth 148 of the connection to the terminal server 130, and/or other system resources. In some implementations, the current utilization level may include a plurality of utilization parameters—for each or some of the system resources 140. For example, the server utilization submodule 156 may monitor the real-time data regarding utilization of the CPU, memory, disk space, disk queue, network bandwidth, etc.

In some implementations, the server utilization submodule 156 may use separate proxies for different system resources. For example, the application A may be a computation-heavy application that uses 5% of CPU resources of the first terminal server but uses only 1% of the of disk space. The overall utilization level may then be computed, in one implementations, as the arithmetic mean of the two proxies, e.g. as (5%+1%)/2=3%. In other implementations, the maximum of the two (or more) proxies may be used as the total utilization level for the application A. For example, even though the disk space, disk queue, network bandwidth, or memory utilization are much less than the CPU utilization, the latter may nonetheless be taken as the overall utilization level. In other implementations, a weighted metric may be used to determine the overall utilization level, such as in the following, $$U = \sum_j A_j U_j$$

where $U_j$ is the current utilization level of the j-th system resource (e.g. 1=1 is the CPU utilization, j=2 is the memory utilization, etc.), $A_j$ are weighting parameters, and U is the overall (weighted) utilization level of the system resources 140. The weighting parameters $A_j$ may be some heuristic parameters pre-determined during a calibration process. Such calibration process may be based on the objective that the weighting parameters $A_j$ are provide such estimates of the overall utilization level U that, on one hand, minimize instances of overestimation of the resource utilization, and, on the other hand, minimize instances where spikes of activity of one or more applications result in degraded performance of the terminal server.

For example, suppose that application 1 has CPU utilization of $U_1$=8% and memory utilization of $U_2$=2%, whereas application 2 has CPU utilization of $U_1$=3% and memory utilization of $U_2$=7%. In the algorithm where the overall utilization level is determined by the system resource with the maximum utilization (a resource "bottleneck") of all system resources, the overall utilization may be counted as U=8% for application 1 and as U=7% for application 2, so that the total server resource utilization level by the two applications may be determined as 8%+7%=15%. Such approach may indeed ensure that both applications receive adequate system resources. Yet, such approach may lead to an underutilization of the terminal server (by preventing the server from accepting more client sessions and/or applications). Indeed, in this example, the total utilization of the CPU is within 8%+3%=11% and the total utilization of the memory is within 2%+7%=9%. Accordingly, the two applications are at most consuming 11% of the system resources, which is significantly less than the 15% estimate in the "bottleneck" approach. To determine the heuristics for more accurate estimation of total server utilization levels, the server utilization submodule 156 may use statistical analysis (e.g., collection of data during actual application execution, Monte Carlo simulations, etc.). In some implementations, the server utilization submodule 156 may use a machine learning model having one or more neuron layers configured to optimize determination of the weighting parameters $A_j$.

The server utilization submodule 156 may treat idle client sessions (in which the amount of computations falls below a certain pre-set threshold) or disconnected client sessions (where a connection to the client device was lost or temporarily terminated by the user) separate from active sessions. In some implementations, idle or disconnected sessions may not be counted towards the current utilization level of the corresponding terminal server that supports the idle or disconnected session. In some implementations, an idle or disconnected session may be counted as using some small fixed portion of the terminal server 130 resources. In some implementations, an idle or disconnected session may be counted as using a fraction of the system resources that the same but active session may be using, with the actual value of the fraction being dependent on the time that the session has been idle or disconnected. For example, a session that has been idle or disconnected for 30 minutes may be counted at 50% of its maximum, a session that has been idle or disconnected for 60 minutes may be counted at 20% of its maximum, and so on. This may free some of the system resources 140 of the terminal server 130 for use by other client sessions 136 while at the same time reserving some of the system resources in case the session is revived (becomes active again), taking into account that the likelihood of such revival may be diminishing with the time of inactivity.

In some implementations, a priority level of an idle or disconnected client session may be decreased compared to a priority level of an active client session currently supported by the same server. In some implementations, idle or disconnected sessions may be counted at 0% (or some nominal value close to 0%) after some fixed cut-off time T. In some implementations, the idle or disconnected session may first have its priority level downgraded prior to the cut-off time. The time T may depend on the priority level, with lower-priority sessions having shorter cut-off times T. If, after time T, the idle or disconnected client session is revived, the SUM 150 may re-determine the new server utilization levels for the terminal server 130 and for other terminal servers and a new determination where the revived session is to be executed (e.g., on which terminal server 130) may be made. For example, in some instances, it may be determined that the terminal server 130 is presently at the limit of its capacity and is not accepting additional client session. In such instances, the revived session may be transferred to a different terminal server. The user of the revived session may be notified about the transfer in some implementations, but in other implementations may be unaware about the transfer.

In the following, all operations performed by the client session priority submodule 152, the server capacity submodule 154, and/or the server utilization submodule 156 of the SUM 150 shall be referred, for conciseness, as operations of the SUM 150.

The SUM 150 may keep track of the current client sessions 136 supported by the terminal server(s) 130 of the remote access computing environment 100. In particular, the SUM 150 may track the number of client devices 102 and users 103 of the client devices 102 currently having open client sessions on one or more terminal server(s) 130, the priority level of each of the client sessions, the status of the client sessions (active, idle, disconnected, downgraded, etc.), and the number and the nature of applications 134 executed as part of the client sessions. When a new session requested by a new user 103 (or the user who attempts to open a new session in addition to previously opened sessions), the SUM 150 may determine a subset of terminal servers 130 that host the application requested by the user. The SUM 150 may also determine which terminal servers 130 (e.g. of the subset of servers hosing the requested application) are at the limit of their capacity (and hence are not to support additional sessions), and which terminal servers can still accept a new session. A server may be able to accept a new session if the expected utilization level of the server—reflecting a subsequent addition of the new client session between the client device and the requested application(s)—is below a minimum value set for the server. The SUM 150 may then select a terminal server for the new session and direct the selected terminal server and/or the client device 102 to establish a connection and to instantiate the new session on the selected terminal server. In some implementations, the SUM 150 may select a terminal server with the lowest current utilization rate. In other implementations, the SUM 150 may choose from a server (or multiple servers) based on the priority of the client session. For example, if the remote access environment 100 uses three priority levels—e.g., "high," "normal," and "low"—the SUM 150 may direct new high-priority client sessions to the terminal server(s) having the lowest current utilization rate. Similarly, the SUM 150 may direct new low-priority client sessions to the terminal server(s) with the highest current utilization rate (provided that such servers have not yet exceeded their maximum utilization rate). In other implementations, the terminal servers may be classified by the priority rate of client sessions that they may support. For example, terminal server 1 may be configured to support only the normal priority client sessions whereas terminal server 2 may support only the low priority client sessions, and so on.

The gateway server 120 (e.g. via the RAS host 122) may also provide to the selected terminal server a list of applications chosen by the user 103 of the client device 102. The selected terminal server 130 may then instantiate the new session and provide this session to the client device 103, as depicted by the dashed box 106 in FIG. 1. The user 103 may then operate one or more chosen applications 108 as part of the client session 106, as if the application(s) 108 were executed locally on the client device 102.

Figure 2:
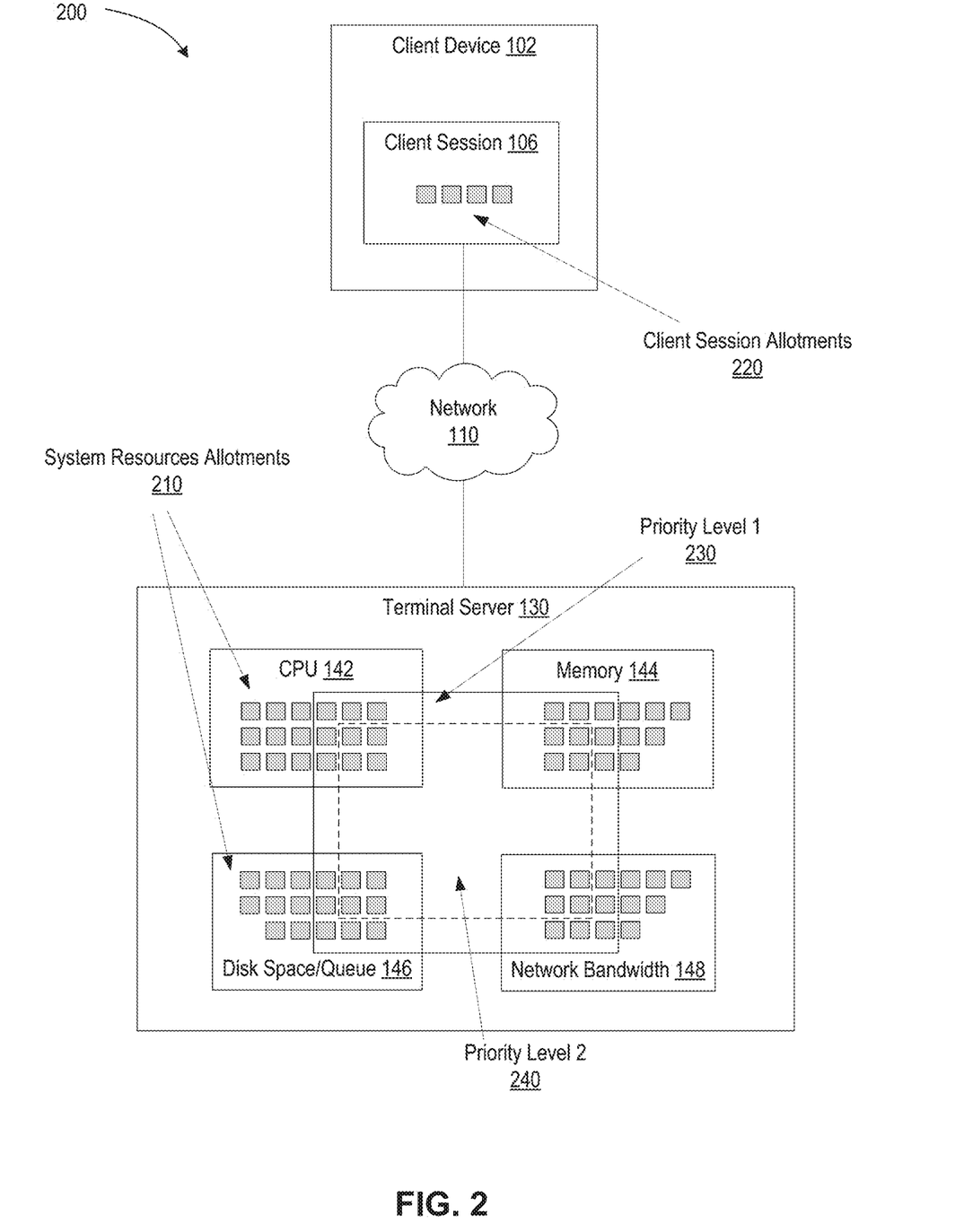
FIG. 2 illustrates a possible scheme of allocation of terminal server system resources, based on a priority level of a client session and the capacity of the terminal server, in accordance with some implementations of the present disclosure.

FIG. 2 illustrates a possible scheme 200 of allocation of terminal server system resources, based on a priority level of a client session and the capacity of the terminal server, in accordance with some implementations of the present disclosure. In the illustrative example shown in FIG. 2, various system resources of the terminal server 130 may be represented by a number of system resource allotments 210. For example, the CPU resources (e.g., speed) 142 are shown to be represented by N=18 allotments (depicted with shaded squares), although any other number N may be selected, depending on how many client sessions the terminal server 130 typically supports. For example, the system resources of a server that typically supports tens (hundreds) of sessions may be more conveniently represented with hundreds (thousands) of allotments. In some implementations, allotments may represent percentage points of the system resources of the terminal server 130. In such implementations, different terminal servers 130 may have the same number of allotments but each allotment may represent a different amount of system resources with respect to different terminal servers. For example, terminal server 1 may have 100 GB of memory while terminal server 2 may have 500 GB of memory. If both servers are represented with 100 allotments, one allotment of server 1 will represent 1 GB of memory, while one allotment of server 2 will represent 5 GB of memory. Such allotment scheme, herein referred to as a "relative scheme," implies that each allotment represents the same portion of the system resources of a particular server.

In other implementations, allotments may be counted using an "absolute scheme," where each allotment may represent a universal unit of the system resources and the number of allotments supported by a server may depend on the amount of its system resources. For example, in the aforementioned illustration involving server 1 and server 2, one allotment may represent 0.5 GB of memory so that the memory resources of terminal server 1 may be represented by 200 allotments whereas the memory resources of terminal server 2 may be represented by 1000 allotments. In the absolute scheme, the number of allotments representing various system resources may be different even within a given server. For example, as schematically depicted in FIG. 2 for illustrative purposes, the number of allotments representing memory 144 and network bandwidth 148 may be the same (fifteen allotments), but may differ from the number of allotments representing CPU 142 speed (sixteen) and disk space/queue 146 (seventeen).

The priority level of the client session 106 may determine a number of allotments to be granted to the client session 106. For example, as schematically depicted in FIG. 2, a client session having priority level 1 (230) may be granted nine allotments of each of the CPU 142, memory 144, disk space 146, and network bandwidth 148, whereas a client session having priority level 2 (240) may have four allotments. The number of allotments to be granted to the client session 106 is also depicted schematically in FIG. 2 with client session allotments 220.

The number of allotments per system resource (CPU 142, memory 144, and so on) shown in FIG. 2 is the same (nine for priority level 1 and four for priority level 2), but this need not always be the case. For example, the client session 106 may be granted different number of allotments for each of the system resources—e.g., 200 allotments for CPU usage, 250 allotments for memory, 150 allotments for disk usage, 300 allotments for network bandwidth, and so on. The number of allotments for various priority levels of client sessions may be specified by the administrator and/or determined based on a current (today), a short-term (one-week), or a long-term (one month) demand for resources of the remote-access environment 100.

The allotments scheme (relative or absolute) representing system resources of the terminal server 130 may be used to quantify the capacity and the current utilization level of the terminal server(s) 130. For example, the terminal server may be characterized by 1000 allotments (for all or some of its system resources); a high-priority session may be granted 100 allotments, a normal-priority session may be granted 50 allotments, and a low-priority session may be granted 20 allotments. The maximum capacity of the terminal server 130 may therefore be 10 high-priority sessions, or 20 normal-priority sessions, or 50 low-priority sessions, or some combination thereof (such as 2 high-priority sessions+ 12 normal-priority sessions+10 low-priority sessions). The current utilization level may be determined by the total number of allocations granted to all currently active client sessions. For example, if the terminal server 130 is supporting 1 high-priority session, 8 normal-priority sessions, and 15 low-priority sessions, the current utilization level may be equal to 800 allotments (1×100+8×50+15×20), i.e. 80% of the maximum server capacity. In some implementations, an idle or disconnected session may be counted towards a utilization level as a nominal number of (e.g., one or two) allotments.

The SUM 150 may set a maximum utilization level for the terminal server 130, which may be less than the maximum capacity of the server (e.g. less than 1000 allotments, in this example), to provide a sufficient margin in case of unexpected surges of session activity. For example, the maximum utilization level may be set at 85%. Accordingly, the terminal server may additionally support one normal-priority client session (50 allotments) or two low-priority client sessions (40 allotments) before the SUM 150 may prevent further client devices from being directed to the server 130. In contrast, a high-priority session, requiring 100 allotments, would have to be directed to a different server, since the expected utilization level of the terminal server 130, after the high-priority session is added, is 900 allotments (90%), which is above the maximum utilization level.

In those implementations where the maximum number of allotments varies between different system resources, the aforementioned determination may be performed separately for a plurality of system resources, e.g. for CPU speed, memory volume, disk usage, network bandwidth, etc. In such implementations, the maximum utilization level may be defined separately for different system resources and further client devices/sessions may be prevented from being directed to the terminal server 130 if any one of the minimum utilization levels is reached for the server 130. Alternatively, a weighted maximum utilization level may be constructed and used instead. This may be performed in a way similar to the above-described construction of the current utilization level. In some implementations, the same weighting parameters $A_j$ may be used. For a given set of the weighting parameters, a comparison of the weighted current utilization level with the weighted maximum utilization level may be used to determine if the terminal server 130 has reached its maximum load and no additional sessions may be directed to it.

Referring back to FIG. 1, the terminal server 130 may have a SUM component 158 that may enforce server utilization policies of the SUM 150. For example, the SUM component 158 may receive, from the SUM 150, and enforce instructions to allocate to the client session, which the server 130 is to establish, a certain portion of the server's system resources. In some implementations, the portion $P = N_{SESSION}/N_0$ of the allocated resources may be determined by the ratio of the number of allotments $N_{SESSION}$ to be granted to the client session to the total number of allotments $N_0$ supported by the system resources of the server.

In some implementations, enforcement of the portion P may be a "hard" enforcement. More specifically, under the hard enforcement scheme, the client session may not be given additional resources (above P) regardless of the changes (e.g., decreases) in the server utilization levels. In other implementations, enforcement of the portion P may be a "soft" enforcement. Under the soft enforcement scheme, the client session may not be given additional resources if the current utilization level U stays above (and/or at) a certain soft utilization threshold $U_{ST}$. In those instances where the current utilization level falls below the soft utilization threshold, the client session may be given additional system resources. The amount of the additional resources may depend on how far the current utilization level U is below the soft utilization threshold $U_{ST}$. For example, all (or some pre-determined fraction) of the difference $U_{ST}-U$ may be distributed among the active sessions currently supported by the server 130, in proportion to these sessions portions P. Reevaluation of the server utilization level may be performed at regular time intervals and/or whenever a new session is added to server or an existing session is closed by the user or the server administrator (or becomes idle or disconnected).

Figure 3:
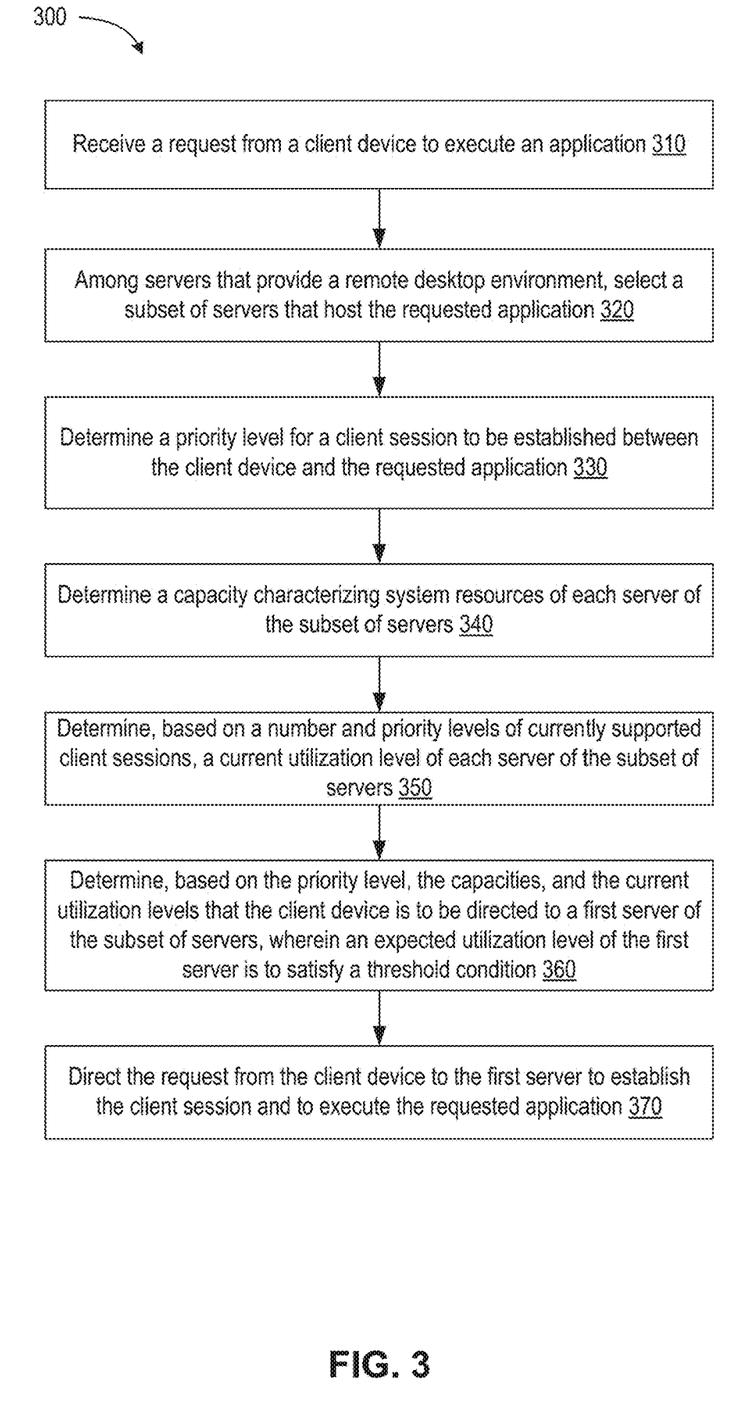
FIG. 3 depicts a flow diagram of one illustrative example of a method of optimized allocation of server resources to client sessions, in accordance with some implementations of the present disclosure.

FIG. 3 depicts a flow diagram of one illustrative example of a method 300 of optimized allocation of server resources to client sessions, in accordance with some implementations of the present disclosure. Method 300, as well as a related method 400 disclosed below, and/or each of their individual functions, routines, subroutines, or operations may be performed by one or more processing units of a processing device implementing the method, e.g., the gateway server 120, the terminal server 130, or another server of the client-host computing environment. In certain implementations, methods 300 and 400 may be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processing threads implementing methods 300 and 400 may be executed asynchronously with respect to each other. Various blocks of the methods 300 and 400 may be performed in a different order compared to the order shown in FIG. 3 and FIG. 4. Some blocks of the methods may be performed concurrently with other blocks. Some blocks may be optional.

The method 300 may begin at block 310 with receiving by a gateway (host) server (e.g., the gateway server 120) a request from a client device (e.g., client device 102) to execute an application. In some implementations, one of the terminal servers 130 may serve (e.g., be designated) as the gateway server. In some implementations, there may be multiple gateway servers in the network environment. A user (e.g., user 103) of the client device may connects to a gateway server specified in the user's RAS client 104 directory.

Prior to sending the request, the client device 102 may receive, from a user of the client device, a selection of one or more applications from a list of applications offered to the user of the client device 102, by the publishing server 126 of the gateway server 120. In some implementations, the publishing server may be at a location different from the gateway server 120 and the gateway server 120 may forward traffic from the client device to the publishing server 126. The request to execute an application may include a request for a full virtual machine environment, a remote desktop access, a word processing application, a computational application, a graphics application, a video application, a gaming application, or any other application capable of being executed on a computer.

Prior to or upon receiving the request from the client device, the gateway server 120 and/or the publishing server 126 may authenticate the client device 102 and/or the user 103. This may include Network Level Authentication, in some implementations. When attempting to establish the connection with the remote host and/or the terminal server, the user of the client device 102 may be prompted to enter a password, in some implementations. In some implementations, the gateway server 120 and/or the publishing server 126 may authenticate the user 103 and/or the client device 102 by using an Active Directory and retrieving the user's group membership information. In some implementation, the client device 102 may be authenticated using a digital certificate, which may be a public key certificate containing a public key, an identifier of the client device, a metadata, a digital signature, and other data.

Following the authentication of the client device, the gateway server 120 may check whether any of the terminal servers of the remote-desktop network environment already have an disconnected, paused, or idle session owned by the client device 102 or user 103. Such a session may have been opened during one of the previous connections between the client device 102 and the remote access network environment 100. If such idle, paused, or disconnected session is found—e.g., on the terminal server 130—the gateway server 120 may treat this session as a new request to execute those applications that were opened as part of the idle or disconnected session.

After successful authentication, the publishing server 126 may check publishing rules in its database, compile an application list that corresponds to the access level of the user 103, and provide the compiled list to the user via the RAS client 104. Upon receiving the list of applications, the user 103 may request a desired published application by, e.g., clicking on an icon of the desired application. Having received the user's request, the gateway server 120 may determine which terminal server 130 is to execute the application.

Specifically, at block 320, the method 300 may continue with selecting, among a plurality of terminal servers that are capable of provide a remote desktop environment (or a remote application execution), a subset of servers that host the requested application(s). In some implementations, the publishing server 126 may include listings of servers that can support a particular application. The gateway server may access such listings to determine the subset of servers that are possible candidates for execution of the application.

At block 330, the method 300 may continue with the gateway server determining a priority level for a client session to be established between the client device and the requested application. In some implementations, the publishing server 129 may access the Active Directory and determine the priority level of the user 103 and/or client device 102 based on the user's (or the client device's) individual or group membership. In some implementations, the priority level of the session may be based on both the general access level of the user and the type of the application that the user requested. For example, the user with a "low" access level may have a higher session priority level when the user selects a financial application compared to an instance when the user selects a graphics application. In some implementations, the session priority level may determine a number of system resource allotments that the client session is to receive.

At block 340, the method 300 may continue with determining a capacity of each server of the subset of servers. The capacity of a server may characterize the system resources of the server, such as CPU, memory, disk space/queue, network bandwidth, and the like. In some implementations, the capacity of each server may be quantified in units of allotments with servers having more resources characterized by a higher number of allotments compared to servers with lower resources. To determine the number of allotments, the gateway server 120 and/or the publishing server 126 may access the most recently updated server listings. The listings may be maintained on the gateway server 120 or at some other location, e.g., on the cloud 112. In some implementations, determining the capacity of the subset of servers may occur before the client device connects to the gateway server. For example, the publishing server 126 or SUM 150 may periodically collect metrics from RAS agents 132 regarding system resources 140 of the terminal servers 130. When a client device requests a session, the sum 150 may access the latest metrics to determine the server capacity.

At block 350, the method 300 may continue with determining a current utilization level of each server of the subset of servers. The current utilization level may be based on a number and priority levels of client sessions currently supported by the respective server, as disclosed above. In some implementations, the current utilization level may be determined as a sum of allotments granted to all active sessions supported by the server. In some implementations, inactive (paused, idle) sessions may be counted as having a reduced number of allotments or may be ignored completely. In some implementations, determining a current utilization level may occur before the client device connects to the gateway server. For example, the publishing server 126 or SUM 150 may periodically collect metrics from RAS agents 132 regarding utilization of system resources 140 of the terminal servers 130. When a client device requests a session, the publishing server 126 or SUM 150 may access the latest metrics to determine the server utilization levels. In other implementations, where the current utilization level of the terminal servers 130 varies (or is expected to vary) significantly with time, the publishing server 126 or SUM 150 may determine the current utilization levels after the client device requests a particular application. For example, the publishing server 126 or SUM 150 may send requests to the RAS agents 132 of the subset of terminal servers that support the requested application and collect from the RAS agents 132 the current utilization metrics for this subset of servers.

At block 360, the gateway server 120 may continue with determining that the client device is to be directed to a first server of the subset of servers. Such determination may be based on the priority level for a new client session that is to be established to support the requested application. Such determination may further be based on the capacities and the current utilization levels of each of the subset of servers. Each server may have its maximum utilization level. When an expected utilization level of a server is above a predetermined threshold value, any additional sessions may not be directed to the server, in one implementation. The maximum utilization levels may be the same for all servers of the remote-access environment, in some implementations. In other implementations, different servers may have different maximum utilization levels (e.g., 95%, 90%, 80%, etc.). The maximum utilization level of a server may be compared against an expected utilization level of that server. The expected utilization level may be the utilization level that reflects a subsequent addition, to the server, of the client session between the client device and the requested application. In instances where multiple servers may satisfy the threshold conditions, the gateway server 120 may make a selection of a server with the least current utilization level or a server with the highest capacity, in some implementations. In other implementations, the gateway server 120 may select a server that is a marked as a preferred server for the application that the user 103 has requested or as a preferred server for the priority level for the client session to be established.

After selecting a server, e.g., a first terminal server, the gateway server 120 may continue, at block 370, with directing the request from the client device to the first server to establish the client session and to execute the requested application as part of the client session. For example, the publishing server 126 or the RAS host 122 may forward the server selection to the RAS client 104 so that the client may connect—directly or via the gateway server 120—to the selected terminal server 130. The terminal server 130 may instantiate a new client session for the user 103 and execute an application as part of this session. The terminal server 130 may forward the client session traffic to the client device 102 through the gateway server 120 or directly. The terminal server 130 may confirm to the publishing server 126 that the new session has been successfully established, and the publishing server 126 may update its records of the current utilization level of the terminal server 130 that may include the information about the new session. If, for some reason, the terminal server 130 has failed to establish a new session, the terminal server may provide a notification to the publishing server 126 about the failure and the publishing server 126 and/or the gateway server 120 may select a different server, e.g., a second server, as a potential host for the new client session. In selecting the second server, the gateway server 120 or the publishing server 126 may follow the same process as described above while treating the first server as unavailable (or as a server that has exceeded its threshold utilization level).

Figure 4:
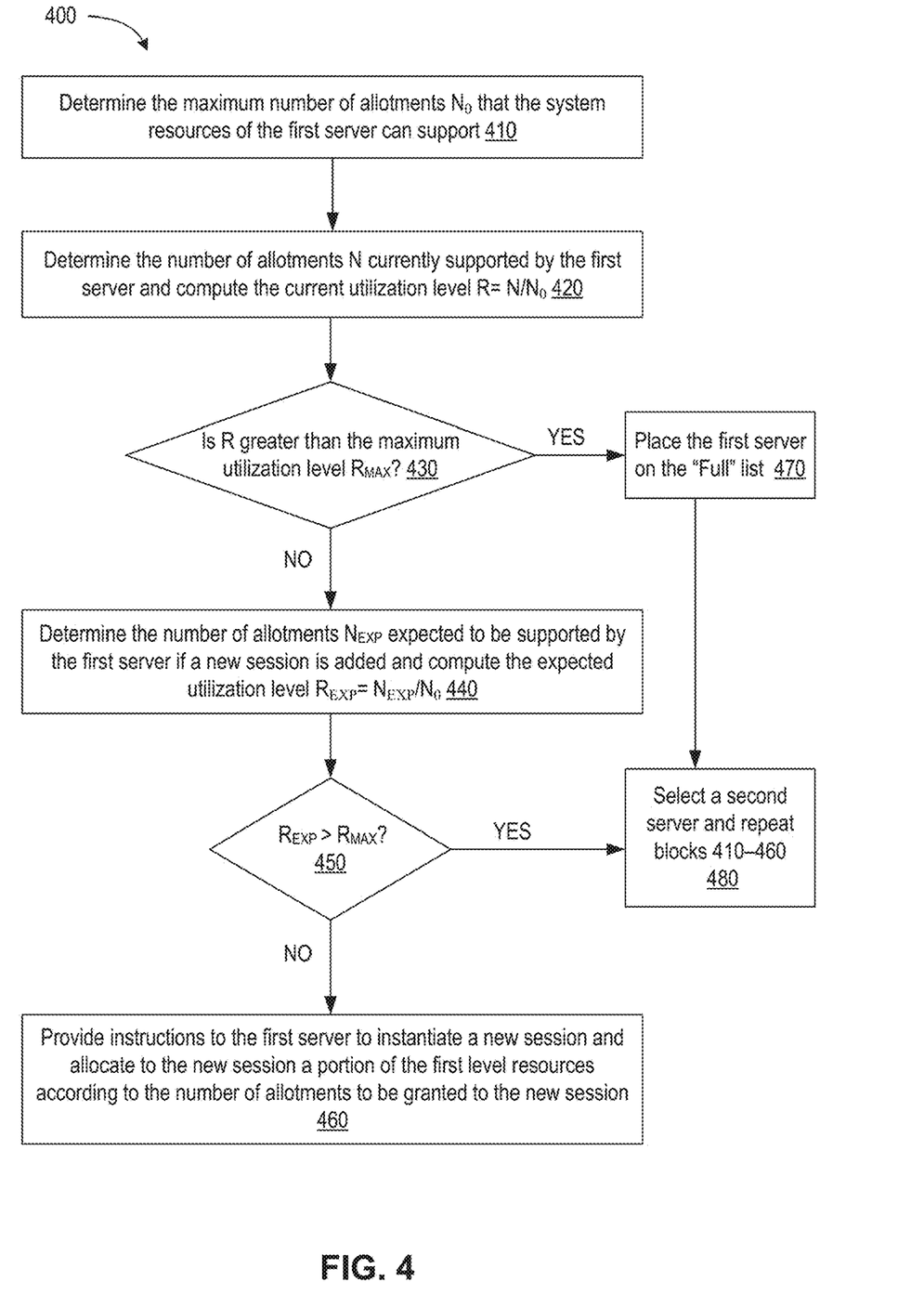
FIG. 4 depicts a flow diagram of one illustrative example of a method of selection of a terminal server that is to support a new client session, in accordance with some implementations of the present disclosure.

FIG. 4 depicts a flow diagram of one illustrative example of a method 400 of selection of a terminal server that is to support a new client session, in accordance with some implementations of the present disclosure. For example, at block 410, a processing device executing method 400 may select server A from the subset of servers that host the requested application. The processing device may determine the maximum number of allotments $N_0$ that the system resources of server A can support. To determine the maximum number of allotments, the publishing server 126 or SUM 150 may access listings (e.g. a file, a table, a spreadsheet, and so on) of allotments for various servers. The listings may be dynamic—updated periodically by RAS agents 132—and may further indicate the number of allotments that are currently free. In some implementations, the maximum number of allotments may be determined by hardware resources of the server, e.g., the CPU speed, the amount of memory, the disk space, etc. In other implementations, the maximum number of allotments $N_0$ may be set by a system administrator and may represent an estimate of the computational capabilities of server A. For example, the maximum number of allotments $N_0$ may indicate a maximum (client/user/application) load that the server can support before the server's users notice a decrease in the server's performance.

At block 420, method 400 may continue with determining the number of allotments N that is currently supported by server A and compute the current utilization ratio $R=N/N_0$, which may be a number within the interval [0,1]. In some instances, the value R may exceed one, if server A has been previously instructed to accept a workload characterized by a higher number of allotments than the maximum number of allotments $N_0$ that can (optimally) be supported by the server (for example, if so instructed by a system administrator). To determine the maximum number of allotments, the publishing server 126 or SUM 150 may access listings of allotments currently available on various servers, which may be periodically provided by RAS agents 132. In some implementation, the publishing server 126 or SUM 150 may request updates from the RAS agents 132 after the client device has requested a client session/application.

At a decision-making block 430, it may be determined (e.g. by publishing server 126 or SUM 150, by accessing listings provided by the RAS agents 132) if the current utilization level exceeds the maximum utilization level for server A by, e.g. comparing the value R with the threshold value $R_{MAX}$. In some implementations, the RAS agents 132 may reduce the priority levels of idle or disconnected sessions, which may decrease the utilization levels of the respective terminal servers. The RAS agents 132 may provide this information (periodically and/or when the utilization levels change) to the publishing server 126 or SUM 150.

If it is determined that $R<R_{MAX}$, the method may proceed with determining (e.g. by the publishing server 126 or SUM 150), at block 440 the total number of allotments $N_{EXP}$ that server A is expected to support if a new session is added and all applications selected by the user 103 of the client device 102 are instantiated on server A. The expected utilization level may then be computed as $R_{EXP}=N_{EXP}/N$. At decision-making block 450, the expected utilization level may be compared to the maximum utilization level. Provided that $R_{EXP}$ does not exceed $R_{MAX}$, the processing device executing method 400 may determine that a new server A is an acceptable terminal server for execution of the requested application(s). Subsequently, method 400 may continue at block 460 with providing instructions to server A to instantiate a new session on behalf of the user 103 of the client device 102. The processing device implementing method 400 may also provide instructions to server A to allocate to the new session a portion of server A resources according to the number of allotments that are to be granted to the new session. The number of allotments may be determined by the priority level of the user 103 and/or the client device 102 (and, in some instances, the number and type of applications requested to be executed).

If, however, it is determined (e.g. by the publishing server 126 or SUM 150), at decision-making block 430, that R is greater or equal to $R_{MAX}$, the processing device performing method 400 may determine that server A is not to support (at least temporarily) additional sessions and may place server A on the "Full" list (470). Any additional sessions are then prevented from being directed to server A until its utilization level drops below $R_{MAX}$. The method may continue with choosing a different server, e.g., server B, and the selection process described in blocks 410-460 may be repeated for server B.

It may be determined (e.g. by the publishing server 126 or SUM 150) at decision-making block 450 that even though the current utilization level of server A is below the threshold, $R<R_{MAX}$, the expected utilization level of server A would be above the threshold, $R_{MAX}<R_{EXP}$, if the new client session were added to server A. In such instances, method 400 may proceed with selecting a different server B and repeating the selection process (480). Server A may not have to be placed on the "Full" list since it may still be possible for a different session (with fewer computational demands, i.e. fewer client session allotments) to be supported with the resources of server A that still remain available.

FIG. 5 depicts a block diagram of an example computer system 500 operating in accordance with one or more aspects of the present disclosure. In various illustrative examples, computer system 500 may represent the host server 120, the first terminal server 130, and/or client device 102, illustrated in FIGS. 1.

Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 300 of optimized allocation of server resources to client sessions, and/or method 400 of selection of a terminal server that is to support a new client session.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 300 of optimized allocation of server resources to client sessions, and/or method 400 of selection of a terminal server that is to support a new client session.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMS), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
receiving, by a gateway server of a network, a request from a client device to execute an application, wherein the network comprises a plurality of servers each capable of providing a remote desktop environment to the client device, and wherein the remote desktop environment provided by each of the plurality of servers hosts a plurality of applications;
selecting a subset of the plurality of servers that each provide a remote desktop environment that hosts the requested application;
determining a priority level for a client session to be established between the client device and the requested application;
determining a capacity of each server of the subset of servers, the capacity characterizing system resources of the respective server independent of a number of client sessions;
determining a current utilization level of each server of the subset of servers in dependence upon a number and priority levels of client sessions currently supported by the respective server, the current utilization level characterizing systems resources employed by active client sessions;
determining, based on the priority level for a client session to be established, and the capacity and the current utilization level of each of the subset of servers, that the client device is to be directed to a first server of the subset of servers, the first server having an expected utilization level that satisfies a threshold condition, wherein the expected utilization level of the first server reflects a subsequent addition of the client session between the client device and the requested application to the first server; and
directing the request from the client device to the first server to establish the client session and to execute the requested application as part of the client session.

2. The method of claim 1, wherein
a priority level of a disconnected client session currently supported by a server is lower than a priority level of an active client session currently supported by the server; and
disconnected client sessions are included within the determination of the current utilization level.

3. The method of claim 1, wherein
determining the capacity of each server of the subset of servers comprises determining a maximum number of allotments to be supported by system resources of the respective server; and
the system resources of the server comprise a bandwidth of a network connection to the server.

4. A system comprising:
a memory that stores instructions; and
a processing device to execute the instructions from the memory to:
receive, by a gateway server of a network, a request from a client device to execute an application, wherein the network comprises a plurality of servers each capable of providing a remote desktop environment to the client device, and wherein the remote desktop environment provided by each of the plurality of servers hosts a plurality of applications;
select a subset of the plurality of servers that each provide a remote desktop environment that hosts the requested application;
determine a priority level for a client session to be established between the client device and the requested application;
determine a capacity of each server of the subset of servers, the capacity characterizing system resources of the respective server independent of a number of client sessions;
determine a current utilization level of each server of the subset of servers in dependence upon based on a number and priority levels of client sessions currently supported by the respective server, the current utilization level characterizing systems resources employed by active client sessions;
determine, based on the priority level for a client session to be established, and the capacity and the current utilization level of each of the subset of servers, that the client device is to be directed to a first server of the subset of servers, the first server having an expected utilization level that satisfies a threshold condition, wherein the expected utilization level of the first server reflects a subsequent addition of the client session between the client device and the requested application to the first server; and
direct the request from the client device to the first server to establish the client session and to execute the requested application as part of the client session.

5. The system of claim 4, wherein
to determine the capacity of each server of the subset of servers the processing device is to determine a maximum number of allotments to be supported by system resources of the respective server; and
the system resources of the server comprise a bandwidth of a network connection to the server.

6. The method according to claim 1, wherein
determining the current utilization level of each server of the subset of servers is determined in dependence upon active sessions, idle sessions and disconnected sessions.

7. The method according to claim 1, wherein
determining the current utilization level of each server of the subset of servers is determined in dependence upon active sessions, idle sessions and disconnected sessions; and
idle sessions and disconnected sessions are counted as using a fraction of the resources of the same but active session.

8. The method according to claim 1, wherein
determining the current utilization level of each server of the subset of servers is determined in dependence upon active sessions, idle sessions and disconnected sessions;
idle sessions and disconnected sessions are counted as using a fraction of the resources of the same but active session; and
the fraction for an idle session or disconnected session is established in dependence upon the time that the session has been idle or disconnected.

9. The method according to claim 1, wherein
a priority level of a client session is established in dependence upon a general access level of a user associated with client session and a type of application for the requested application.

10. The method according to claim 1, wherein
a priority level of a client session is established in dependence upon a general access level and a type of application for the requested application; and
the general access level is established in dependence upon an identity of a user associated with client session and an identity of the client device.

11. The method according to claim 1, wherein
a priority level of a client session is established in dependence upon a priority assigned to a group of a plurality of groups; and
the group of the plurality of groups is established in dependence upon one of:
the requested application;
an identity of the client device; and
an identity of a user associated with the remote session.

12. The method according to claim 1, wherein
each system resource of a set of system resources of each server of the subset of servers is associated with a predetermined number of allotments;
a number of allotments allocated to a client session for each system resource of the set of system resources are established in dependence of a priority level of the client session;
the capacity of a server of the subset of servers is established in dependence upon the allotments associated with each priority level of a plurality of priority levels;
the current utilization is established in dependence upon the allotments associated with currently active client sessions; and
each allotment for each system resource of a set of system resources represents a universal unit of the system resource.

13. The method according to claim 1, wherein
each system resource of a set of system resources of each server of the subset of servers is associated with a predetermined number of allotments;
a number of allotments allocated to a client session for each system resource of the set of system resources are established in dependence of a priority level of the client, session;
the capacity of a server of the subset of servers is established in dependence upon the allotments associated with each priority level of a plurality of priority levels;
the current utilization is established in dependence upon the allotments associated with currently active client sessions; and
each allotment for each system resource of a set of system resources for each server of the subset of servers represents a constant portion of the system resources.

14. The system according to claim 1, wherein
determining the current utilization level of each server of the subset of servers is determined in dependence upon active sessions, idle sessions and disconnected sessions.

15. The system according to claim 1, wherein
determining the current utilization level of each server of the subset of servers is determined in dependence upon active sessions, idle sessions and disconnected sessions; and
idle sessions and disconnected sessions are counted as using a fraction of the resources of the same but active session.

16. The system according to claim 1, wherein
determining the current utilization level of each server of the subset of servers is determined in dependence upon active sessions, idle sessions and disconnected sessions;
idle sessions and disconnected sessions are counted as using a fraction of the resources of the same but active session; and
the fraction for an idle session or disconnected session is established in dependence upon the time that the session has been idle or disconnected.

17. The system according to claim 1, wherein
a priority level of a client session is established in dependence upon a general access level of a user associated with client session and a type of application for the requested application.

18. The system according to claim 1, wherein
a priority level of a client session is established in dependence upon a general access level and a type of application for the requested application; and
the general access level is established in dependence upon an identity of a user associated with client session and an identity of the client device.

19. The system according to claim 1, wherein
a priority level of a client session is established in dependence upon a priority assigned to a group of a plurality of groups; and
the group of the plurality of groups is established in dependence upon one of:
the requested application;
an identity of the client device; and
an identity of a user associated with the remote session.

20. The system according to claim 1, wherein
each system resource of a set of system resources of each server of the subset of servers is associated with a predetermined number of allotments;
a number of allotments allocated to a client session for each system resource of the set of system resources are established in dependence of a priority level of the client session;
the capacity of a server of the subset of servers is established in dependence upon the allotments associated with each priority level of a plurality of priority levels;

the current utilization is established in dependence upon the allotments associated with currently active client sessions; and each allotment for each system resource of a set of system resources represents a universal unit of the system resource.

21. The system according to claim 1, wherein each system resource of a set of system resources of each server of the subset of servers is associated with a predetermined number of allotments;

a number of allotments allocated to a client session for each system resource of the set of system resources are established in dependence of a priority level of the client session;

the capacity of a server of the subset of servers is established in dependence upon the allotments associated with each priority level of a plurality of priority levels;

the current utilization is established in dependence upon the allotments associated with currently active client sessions; and each allotment for each system resource of a set of system resources for each server of the subset of servers represents a constant portion of the system resources.

22. The system according to claim 4, wherein a priority level of a disconnected client session currently supported by a server is lower than a priority level of an active client session currently supported by the server; and disconnected client sessions are included within the determination of the current utilization level.

* * * * *